(12) United States Patent
Altman et al.

(10) Patent No.: US 10,970,777 B2
(45) Date of Patent: Apr. 6, 2021

(54) APPARATUS AND METHOD FOR BILL PAYMENT CARD ENROLLMENT

(75) Inventors: Theresa Altman, St. Peters, MO (US); Gidget Hall, Town and Country, MO (US); Edward McLaughlin, Newtown, PA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1915 days.

(21) Appl. No.: 12/558,869

(22) Filed: Sep. 14, 2009

(65) Prior Publication Data

US 2010/0100480 A1 Apr. 22, 2010

Related U.S. Application Data

(60) Provisional application No. 61/097,009, filed on Sep. 15, 2008.

(51) Int. Cl.
*G06Q 40/02* (2012.01)
*G06Q 10/10* (2012.01)
(Continued)

(52) U.S. Cl.
CPC ............ *G06Q 40/02* (2013.01); *G06Q 10/10* (2013.01); *G06Q 20/102* (2013.01); *G06Q 30/04* (2013.01)

(58) Field of Classification Search
CPC .............................. G06Q 40/00; G06Q 20/00
(Continued)

(56) References Cited

U.S. PATENT DOCUMENTS 5,220,501 A 6/1993 Lawlor et al.
5,265,008 A 11/1993 Benton
(Continued)

FOREIGN PATENT DOCUMENTS

MX 2011002707 * 12/2011
WO WO97/17678 5/1997
(Continued)

OTHER PUBLICATIONS

"MasterCard Payment Gateway, e-P3." downloaded from http://www.mastercard.com/us/business/en/corporate/purchasingsolutions/integration/ep3/paymentgateway.html.
(Continued)

*Primary Examiner* — Daniel S Felten
(74) *Attorney, Agent, or Firm* — Otterstedt, Wallace & Kammer, LLP

(57) ABSTRACT

A bill payment provider offers to a customer an option to pay a bill from a biller using a payment card account. The offering is carried out via a mechanism of the bill payment provider. The mechanism is of a kind which normally facilitates payments via electronic funds transfer from a demand deposit account of the customer. A request to pay the bill using the payment card account is received via the mechanism. Payment of the bill using the payment card account is facilitated by formatting and dispatching a message from the bill payment provider to an electronic bill payment system. The message is flagged with a flag indicating that the message comprises a non-financial, card payment, message. The message includes an identification of the biller, a card number of the payment card account, and an expiration date of the payment card account. The message is an electronic funds transfer message augmented with the flag, the card number, and the expiration date. An alternative technique using an operator of a payment network is also disclosed, as are corresponding systems.

15 Claims, 10 Drawing Sheets

(51) Int. Cl.
*G06Q 20/10* (2012.01)
*G06Q 30/04* (2012.01)

(58) Field of Classification Search
USPC .......................................... 705/40; 235/380
See application file for complete search history.

(56) References Cited

U.S. PATENT DOCUMENTS

| | | | |
|---|---|---|---|
| 5,326,959 A | 7/1994 | Perazza | |
| 5,383,113 A | 1/1995 | Kight et al. | |
| 5,465,206 A | 11/1995 | Hilt et al. | |
| 5,483,445 A | 1/1996 | Pickering | |
| 5,659,165 A | 8/1997 | Jennings et al. | |
| 5,684,965 A | 11/1997 | Pickering | |
| 5,699,528 A | 12/1997 | Hogan | |
| 5,774,553 A | 6/1998 | Rosen | |
| 5,787,402 A | 7/1998 | Potter et al. | |
| 5,850,446 A | 12/1998 | Berger et al. | |
| 5,873,072 A | 2/1999 | Kight et al. | |
| 5,893,080 A | 4/1999 | McGurl et al. | |
| 5,897,621 A | 4/1999 | Boesch et al. | |
| 5,920,847 A | 7/1999 | Kolling et al. | |
| 5,943,424 A * | 8/1999 | Berger et al. | 705/64 |
| 5,943,656 A | 8/1999 | Crooks et al. | |
| 5,963,647 A | 10/1999 | Downing et al. | |
| 5,970,475 A | 10/1999 | Barnes | |
| 5,978,485 A | 11/1999 | Rosen | |
| 5,978,780 A | 11/1999 | Watson | |
| 6,019,282 A | 2/2000 | Thompson | |
| 6,032,133 A | 2/2000 | Kight et al. | |
| 6,035,285 A | 3/2000 | Schlect et al. | |
| 6,052,671 A | 4/2000 | Crooks et al. | |
| 6,072,870 A | 6/2000 | Nguyen et al. | |
| 6,119,106 A | 9/2000 | Mersky et al. | |
| 6,138,107 A | 10/2000 | Elgamal | |
| 6,205,433 B1 | 3/2001 | Boesch et al. | |
| 6,223,168 B1 | 4/2001 | McGurl et al. | |
| 6,269,345 B1 | 7/2001 | Riboud | |
| 6,304,915 B1 | 10/2001 | Nguyen et al. | |
| 6,311,170 B1 | 10/2001 | Embrey | |
| 6,363,362 B1 | 3/2002 | Burfield et al. | |
| 6,366,893 B2 | 4/2002 | Hannula et al. | |
| 6,385,595 B1 * | 5/2002 | Kolling et al. | 705/40 |
| 6,408,284 B1 | 6/2002 | Hilt et al. | |
| 6,438,528 B1 | 8/2002 | Jensen et al. | |
| 6,510,451 B2 | 1/2003 | Wu et al. | |
| 6,606,606 B2 | 8/2003 | Starr | |
| 6,609,113 B1 * | 8/2003 | O'Leary et al. | 705/39 |
| 6,807,410 B1 | 10/2004 | Pailles et al. | |
| 6,856,970 B1 | 2/2005 | Campbell et al. | |
| 6,883,004 B2 | 4/2005 | Bahl et al. | |
| 6,892,184 B1 | 5/2005 | Komem et al. | |
| 6,944,595 B1 | 9/2005 | Graser | |
| 6,983,261 B1 | 1/2006 | Francisco et al. | |
| 7,028,008 B2 | 4/2006 | Powar | |
| 7,051,002 B2 | 5/2006 | Keresman et al. | |
| 7,058,612 B2 | 6/2006 | Park et al. | |
| 7,076,465 B1 | 7/2006 | Blagg et al. | |
| 7,080,035 B1 | 7/2006 | Williams | |
| 7,089,213 B2 | 8/2006 | Park et al. | |
| 7,107,244 B2 | 9/2006 | Kight et al. | |
| 7,133,844 B2 | 11/2006 | Park et al. | |
| 7,213,003 B1 | 5/2007 | Kight et al. | |
| 7,240,031 B1 | 7/2007 | Kight et al. | |
| 2001/0025265 A1 | 9/2001 | Takayasu | |
| 2001/0044776 A1 | 11/2001 | Kight et al. | |
| 2001/0056390 A1 | 12/2001 | Varadarajan et al. | |
| 2002/0002537 A1 | 1/2002 | Bastiansen | |
| 2002/0023053 A1 | 2/2002 | Szoc et al. | |
| 2002/0032651 A1 | 3/2002 | Embrey | |
| 2002/0038305 A1 | 3/2002 | Bahl et al. | |
| 2002/0055907 A1 | 5/2002 | Pater et al. | |
| 2002/0059113 A1 | 5/2002 | Bahl et al. | |
| 2002/0059114 A1 | 5/2002 | Cockrill et al. | |
| 2002/0062282 A1 | 5/2002 | Kight et al. | |
| 2002/0065773 A1 | 5/2002 | Kight et al. | |
| 2002/0077977 A1 | 6/2002 | Neely et al. | |
| 2002/0099656 A1 | 7/2002 | Wong | |
| 2002/0103752 A1 | 8/2002 | Berger et al. | |
| 2002/0143701 A1 | 10/2002 | Maguire et al. | |
| 2002/0178117 A1 | 11/2002 | Maguire et al. | |
| 2002/0198798 A1 | 12/2002 | Ludwig et al. | |
| 2002/0198828 A1 | 12/2002 | Ludwig et al. | |
| 2002/0198829 A1 | 12/2002 | Ludwig et al. | |
| 2002/0198835 A1 | 12/2002 | Watson | |
| 2003/0004874 A1 | 1/2003 | Ludwig et al. | |
| 2003/0023552 A1 | 1/2003 | Kight et al. | |
| 2003/0105710 A1 * | 6/2003 | Barbara et al. | 705/39 |
| 2003/0130921 A1 | 7/2003 | Force et al. | |
| 2003/0130942 A1 | 7/2003 | Campbell et al. | |
| 2003/0130943 A1 | 7/2003 | Campbell et al. | |
| 2003/0130944 A1 | 7/2003 | Force et al. | |
| 2003/0130945 A1 | 7/2003 | Force et al. | |
| 2003/0145043 A1 | 7/2003 | Matuska | |
| 2003/0163425 A1 | 8/2003 | Cannon, Jr. | |
| 2003/0167229 A1 | 9/2003 | Ludwig et al. | |
| 2003/0187789 A1 | 10/2003 | Karas et al. | |
| 2003/0187792 A1 | 10/2003 | Hansen et al. | |
| 2003/0204457 A1 | 10/2003 | Arias | |
| 2003/0208440 A1 | 11/2003 | Harada et al. | |
| 2003/0208442 A1 | 11/2003 | Cockrill et al. | |
| 2003/0216990 A1 | 11/2003 | Star | |
| 2003/0220858 A1 | 11/2003 | Lam et al. | |
| 2004/0039699 A1 | 2/2004 | Egendorf | |
| 2004/0049459 A1 | 3/2004 | Philliou et al. | |
| 2004/0064407 A1 | 4/2004 | Kight et al. | |
| 2004/0064408 A1 | 4/2004 | Kight et al. | |
| 2004/0064409 A1 | 4/2004 | Kight et al. | |
| 2004/0064410 A1 | 4/2004 | Kight et al. | |
| 2004/0078329 A1 | 4/2004 | Kight et al. | |
| 2004/0083167 A1 | 4/2004 | Kight et al. | |
| 2004/0083171 A1 | 4/2004 | Kight et al. | |
| 2004/0093269 A1 | 5/2004 | Rubin et al. | |
| 2004/0093305 A1 | 5/2004 | Kight et al. | |
| 2004/0128240 A1 | 7/2004 | Yusin | |
| 2004/0128255 A1 | 7/2004 | Jung | |
| 2004/0143552 A1 | 7/2004 | Weichert | |
| 2004/0167823 A1 | 8/2004 | Neely | |
| 2004/0167853 A1 | 8/2004 | Sharma | |
| 2004/0210520 A1 | 10/2004 | Fitzgerald et al. | |
| 2004/0215560 A1 | 10/2004 | Amalraj et al. | |
| 2004/0230526 A1 | 11/2004 | Praisner | |
| 2004/0230539 A1 | 11/2004 | Praisner | |
| 2004/0236646 A1 | 11/2004 | Wu et al. | |
| 2005/0021454 A1 | 1/2005 | Karpovich et al. | |
| 2005/0021455 A1 | 1/2005 | Webster | |
| 2005/0033690 A1 | 2/2005 | Antognini et al. | |
| 2005/0038739 A1 | 2/2005 | Doran | |
| 2005/0049963 A1 | 3/2005 | Barry | |
| 2005/0075960 A1 | 4/2005 | Leavitt et al. | |
| 2005/0097040 A1 | 5/2005 | Chen et al. | |
| 2005/0102231 A1 | 5/2005 | Remington | |
| 2005/0137952 A1 | 6/2005 | Yamamoto et al. | |
| 2005/0154674 A1 | 7/2005 | Nicholls et al. | |
| 2005/0167481 A1 | 8/2005 | Hansen et al. | |
| 2005/0171811 A1 | 8/2005 | Campbell et al. | |
| 2005/0177437 A1 | 8/2005 | Ferrier | |
| 2005/0177495 A1 | 8/2005 | Crosson et al. | |
| 2005/0177504 A1 | 8/2005 | Crosson et al. | |
| 2005/0177521 A1 | 8/2005 | Crosson et al. | |
| 2005/0197957 A1 | 9/2005 | Keith et al. | |
| 2005/0209965 A1 | 9/2005 | Ganesan | |
| 2006/0015452 A1 | 1/2006 | Kulasooriya et al. | |
| 2006/0015453 A1 | 1/2006 | Kulasooriya et al. | |
| 2006/0036543 A1 | 2/2006 | Blagg et al. | |
| 2006/0059088 A1 | 3/2006 | Krikorian et al. | |
| 2006/0106694 A1 | 5/2006 | Carlson | |
| 2006/0116949 A1 | 6/2006 | Wehunt | |
| 2006/0173779 A1 | 8/2006 | Bennett | |
| 2006/0190380 A1 | 8/2006 | Force et al. | |
| 2007/0011104 A1 | 1/2007 | Leger et al. | |
| 2007/0100770 A1 | 5/2007 | Grinberg et al. | |
| 2007/0282743 A1 | 12/2007 | Lovelett | |
| 2008/0021835 A1 | 1/2008 | Ginter | |

(56) References Cited

U.S. PATENT DOCUMENTS

| | | |
|---|---|---|
| 2008/0046364 A1 | 2/2008 | Hall |
| 2008/0065520 A1 | 3/2008 | Hazlehurst |
| 2008/0208707 A1 | 8/2008 | Erbey |
| 2009/0076951 A1* | 3/2009 | Szamel .......................... 705/39 |
| 2009/0171839 A1 | 7/2009 | Rosano |
| 2010/0057553 A1* | 3/2010 | Ameiss et al. ............ 705/14.32 |
| 2010/0174644 A1 | 7/2010 | Rosano |

FOREIGN PATENT DOCUMENTS

| | | | |
|---|---|---|---|
| WO | WO99/03243 | | 1/1999 |
| WO | WO2006026418 | | 3/2006 |
| WO | WO 2010/031045 | * | 3/2010 |
| WO | WO2010056967 | | 5/2010 |

OTHER PUBLICATIONS

"Mastercard Remote Payment and Presentment Services." downloaded from https://www.mastercardintl.com/rpps/.

"Online Bill Payment." downloaded from https://www.mastercardintl.com/rpps/lvl2.cgi/obp_2.

"Mastercard RPPS". Downloaded from https://www.mastercardintl.com/rpps/glossary.cgi.

* cited by examiner

APPARATUS AND METHOD FOR BILL PAYMENT CARD ENROLLMENT

CROSS-REFERENCE TO RELATED APPLICATIONS

This patent application claims the benefit of U.S. Provisional Patent Application Ser. No. 61/097,009 filed Sep. 15, 2008 and entitled "Apparatus and Method For Bill Payment Card Enrollment" of inventors Altman and Hall. The disclosure of the aforementioned Provisional Patent Application Ser. No. 61/097,009 is expressly incorporated herein by reference in its entirety for all purposes.

FIELD OF THE INVENTION

The present invention relates generally to the electronic and computer arts, and, more particularly, to apparatus and methods for electronic payments.

BACKGROUND OF THE INVENTION

Movement of consumer bill payments from paper to electronic methods continues to increase. Using methods such as Automated Clearing House (ACH), debit, credit, and online banking, electronic bill payments have gone from 22% in 2001 to 45% in 2005, according to the American Bankers Association, Dove Consulting, US Consumer payment trends 2005. Furthermore, according to a recent E SOURCE market research study, PRNewswire, E SOURCE, 2008 Self-Service Customer Care Market Research Study, 51% of Internet users in the U.S. and Canada now pay at least one monthly bill online, which represents a substantial increase over the results of the company's 2004 research that indicated only 33% of Internet users were making online payments.

SUMMARY OF THE INVENTION

Principles of the present invention provide techniques for facilitating bill payment card enrollment. In one aspect, an exemplary method (which can be computer-implemented) can include the step of offering, by a bill payment provider to a customer, an option to pay a bill from a biller using a payment card account. The offering is carried out via a mechanism of the bill payment provider. The mechanism is of a kind which normally facilitates payments via electronic funds transfer from a demand deposit account of the customer. An additional step includes receiving, via the mechanism, a request to pay the bill using the payment card account. A further step includes facilitating payment of the bill using the payment card account by formatting and dispatching a message from the bill payment provider to an electronic bill payment system. The message is flagged with a flag indicating that the message comprises a non-financial, card payment, message. The message includes an identification of the biller, a card number of the payment card account, and an expiration date of the payment card account. The message is an electronic funds transfer message augmented with the flag, the card number, and the expiration date.

In another aspect, a system includes a bill payment provider server, under control of a bill payment provider. The server has a bill payment provider memory, at least one bill payment provider processor coupled to the bill payment provider memory, and an interface to an electronic bill payment system. The interface is coupled to the bill payment provider processor. The bill payment provider processor is operative to carry out, or facilitate carrying out, one or more method steps just described.

In still another aspect, another exemplary method (which can be computer-implemented) can include the step of offering, by a bill payment provider to a customer, an option to pay a bill from a biller using a payment card account. The offering is carried out via a mechanism which normally facilitates payments via electronic funds transfer from a demand deposit account of the customer. An additional step includes receiving, via the mechanism, a request to pay the bill using the payment card account. A further step includes facilitating payment of the bill using the payment card account by formatting and dispatching a file from the bill payment provider to the biller, via an operator of a payment network. The file includes an identification of the biller, a card number of the payment card account, and an expiration date of the payment card account.

In yet another aspect, a system includes a bill payment provider server, under control of a bill payment provider. The bill server has a bill payment provider memory, at least one bill payment provider processor coupled to the bill payment provider memory, and an interface to a payment network. The interface is coupled to the bill payment provider processor. The bill payment provider processor is operative to carry out, or facilitate carrying out, one or more method steps just described.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
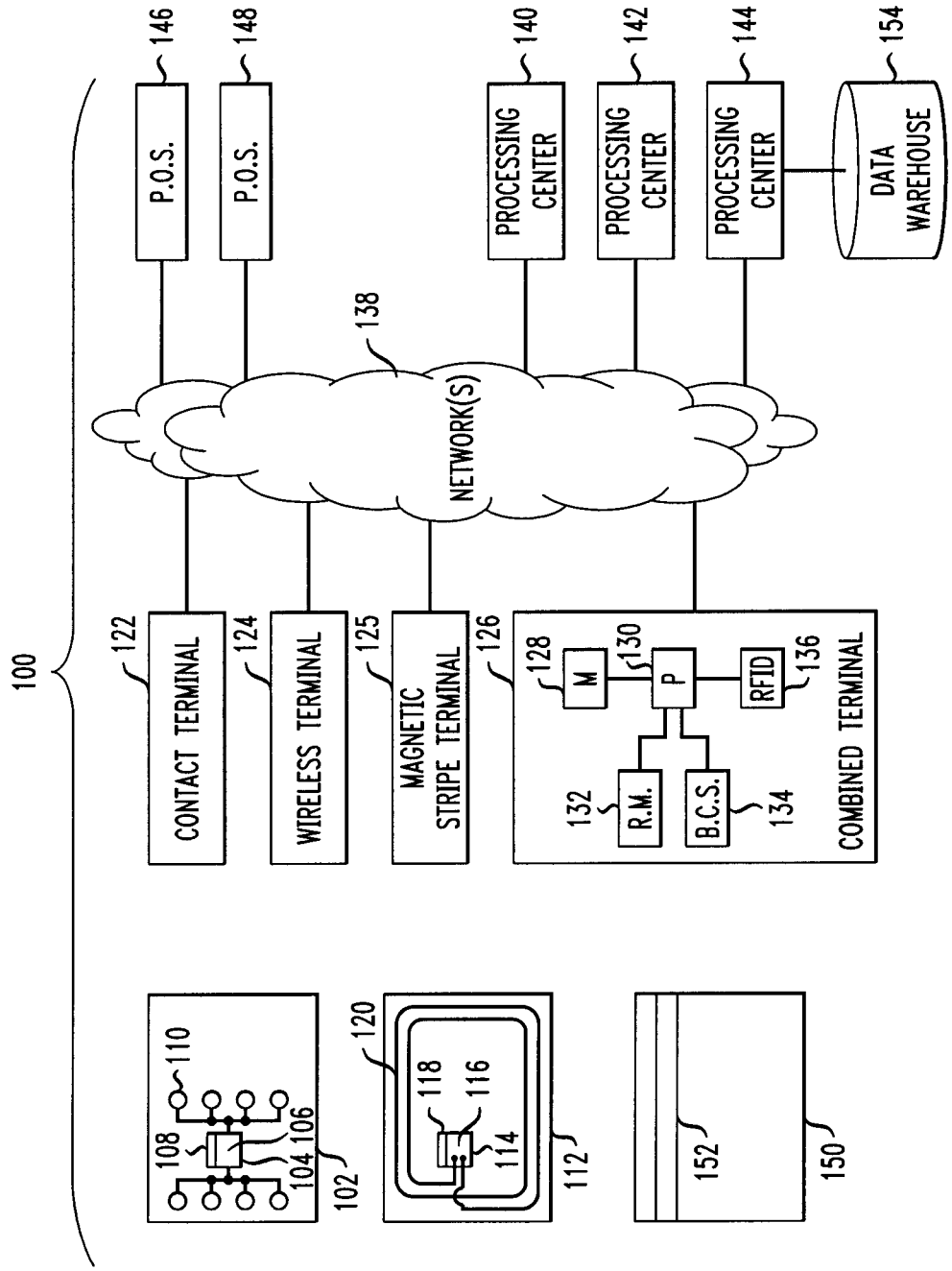
FIG. 1 shows an example of a system that can implement techniques of the invention.

Inventive techniques can be employed in a number of different environments; in some instances, with any type of electronic bill payment system. In one or more embodiments, inventive techniques can be employed with the MASTERCARD RPPS® electronic payment system of MasterCard International Incorporated of Purchase, New York, USA. FIG. 1 is provided for exemplary purposes and depicts physical interface of cards with terminals, but it should be understood that in one or more instances of the invention, a consumer may simply provide card account information to an entity via telephone, web site, and the like, without physically scanning the card at a terminal.

Attention should now be given to FIG. 1, which depicts an exemplary embodiment of a system 100, including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the invention. Other types of devices could include a conventional card 150 having a magnetic stripe 152, an appropriately configured cellular telephone handset, and the like. Indeed, techniques of the invention can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the invention is the MULTOS® operating system licensed by licensed by MAOSCO Limited. (MAOSCO Limited, St. Andrews House, The Links, Kelvin Close, Birchwood, Warrington, WA3 7PB, United Kingdom). Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

In some cases, implementations conform to pertinent ISO standards, such as ISO 8583. Individual entities or groups may develop specifications within this standard.

As noted, cards 102, 112 are examples of a variety of payment devices that can be employed with techniques of the invention. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe card can be employed; furthermore, in some cases no physical presentment of a card to a terminal is required, and in one or more instances, a payment card account with an account number but no physical card could even be employed.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated off Purchase, New York, USA. More than one network could be employed to connect different elements of the system. For example, a local area network (LAN) could connect a terminal to a local server or other computer at a retail establishment. A payment network could connect acquirers and issuers. Processing centers 140, 142, 144 can include, for example, a host computer of an issuer of a payment device (or processing functionality of other entities discussed in FIGS. 2-7 and 9-11 herein).

Many different retail or other establishments, as well as other entities, generally represented by points-of-sale 146, 148, can be connected to network 138. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

The portable device can include a body portion. For example, this could be a laminated plastic body (as discussed above) in the case of "smart" cards 102, 112, or the handset chassis and body in the case of a cellular telephone.

Again, conventional magnetic stripe cards 150 can be used instead of or together with "smart" or "chip" cards, and as noted in some cases, a card account with no physical card can be employed.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather data, such as a product identification, from a UPC code or RFID tag on a product to be purchased.

The above-described devices 102, 112 can be ISO 7816-compliant contact cards or devices or ISO 14443-compliant proximity cards or devices. In operation, card 112 can be touched or tapped on the terminal 124 or 126, which then contactlessly transmits the electronic data to the proximity IC chip in the card 112 or other wireless device. Magnetic stripe cards can be swiped in a well-known manner. Again, in one or more instances, the card number is simply provided via telephone, web site, or the like.

One or more of the processing centers 140, 142, 144 can include a database such as a data warehouse 154 for storing information of interest. In the context of one or more embodiments of the invention, such as those depicted in FIGS. 2-7, a consumer could hold a device such as 102, 122, 150 and the entities in FIGS. 2-7 could operate processing centers such as 140, 142, 144 (with data storage 154 as needed). Network(s) 138 could, as noted, include a virtual private network (VPN) and/or the Internet; the VPN could be, for example, the aforementioned BANKNET® network.

Figure 9:
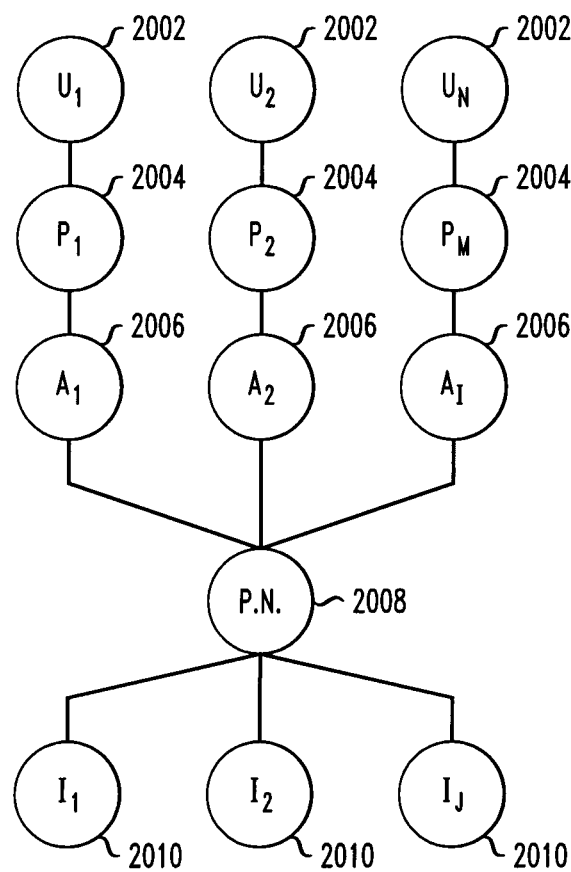
FIG. 9 depicts an exemplary inter-relationship between and among: (i) a payment network configured to facilitate transactions between multiple issuers and multiple acquirers, (ii) a plurality of users, (iii) a plurality of providers or other merchants, (iv) a plurality of acquirers, and (v) a plurality of issuers.

With reference to FIG. 9, an exemplary relationship among multiple entities is depicted. A number of different users 2002, $U_1, U_2 \ldots U_N$, interact with a number of different merchants 2004, $P_1, P_2 \ldots P_M$. Users 2002 could be, for example, holders of payment cards. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. Authorized transactions are stored in "batches," which are sent to the acquirer 2006. During clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 9 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer, such as the AMERICAN EXPRESS network (mark of American Express Company).

Figure 10:
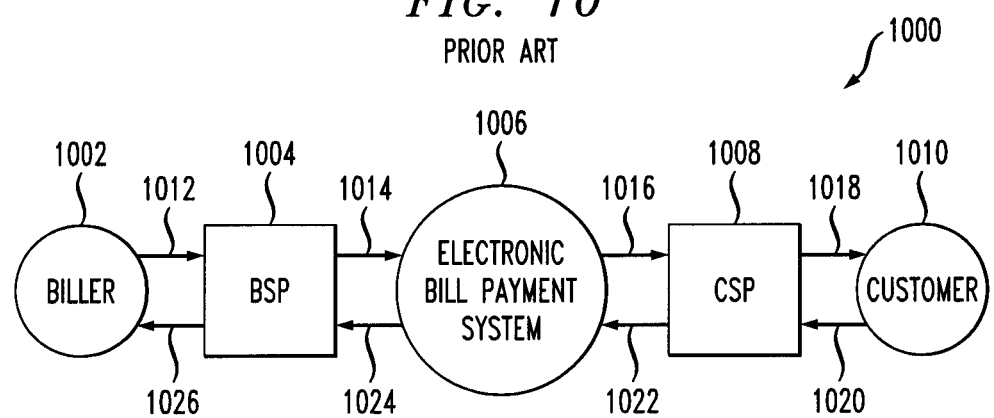
FIG. 10 shows exemplary operation of a current bill pay system.

FIG. 10 shows operation of a current electronic bill payment system, such as the aforementioned MASTERCARD RPPS® electronic payment system, which is but one non-limiting example of such a system. Given the teachings herein, the skilled artisan will be able to implement one or more embodiments of the invention using a variety of techniques; by way of example and not limitation, the modification of an existing system such as that shown in FIG. 10 using techniques described herein. As shown in FIG. 10, in a current approach 1000, during a presentment phase, a biller 1002 electronically sends billing information 1012 to its biller service provider (BSP) 1004, that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seem at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Figure 11:
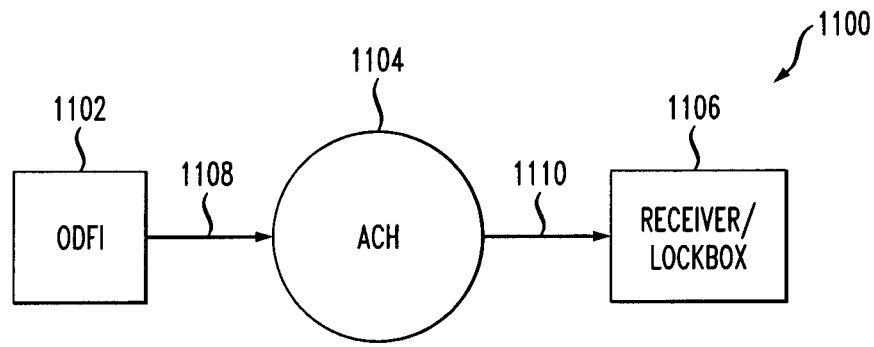
FIG. 11 shows exemplary operation of current automated clearinghouse payments.

FIG. 11 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; one non-limiting example of an ACH file format is the NACHA ACH CCD file format. Other formats can also be used; for example, extensible markup language (XML). It should be noted that a variety of networks can be used, both public (for example, ACH) and proprietary (for example, the aforementioned MASTERCARD RPPS system).

Aspects of the invention will be illustrated within the context of a card enrollment pilot that leverages successful industry practices to create an advantageous program. Purely by way of example and not limitation, some aspects of the illustration will be provided in the context of an initial pilot including an early engagement with one key issuer to maximize potential results, as well as with consumers who already have one recurring bill on their card and thus are more receptive to the concept. Some instances also provide a potential regional play to get category leaders in a specific geographic area to increase relevancy to the consumer.

One or more embodiments of the invention may provide one or more of the following benefits to one or more of the following parties:

Value to Issuer/Originating Bank: Advantageously, it may be possible to move check writers to recurring card payments (lower cost), obtain increased consumer retention, particularly from recurring payments, and/or satisfy consumer demand and allow consumer choice. Furthermore, in some instances, an entity can consider assistance to help fund development of requirements, marketing, etc.; such an entity could be, for example, the operator of a payment network (hereinafter, "payment network operator") operating according to a payment standard and/or specification. Examples of the payment network include those of the kind configured to facilitate transactions between multiple issuers and multiple acquirers as shown in FIG. 9; for example, the BANKNET® network of MasterCard International Incorporated, or the VISANET® network of Visa International Service Association.

Value to Biller: Certain benefits may accrue to the biller; for example, reduced exposure to bad checks and delinquencies; improved collection costs; movement of check writers to recurring payments (lower risk); paper suppression (lower cost); improved cash flow; and/or reduced payment-related customer service calls.

Value to operator of a payment network: The operator may advantageously obtain a consumer acquisition channel and/or marketing and exposure via leading issuers' sales channels (issuer web, interactive voice response (IVR), etc.) and/or online banking sites. Further, in some instances, a pilot structure allows testing to generate learning.

Today, consumers pay bills using several methods. These methods are outlined hereinafter. One method includes mailing a check to the biller; e.g., a lawn service, utilities, or mortgage. Advantageously, the consumer has 'float,' i.e., the payment posts (manually in the consumer's check register) before the money is taken from the checking account. However, this method is slow, and it can be difficult for the consumer to find receipts.

Another method includes paying at the online bank tool by DDA (demand deposit account; e.g., checking). Examples of bills paid in this fashion include regional utilities, mortgage companies, common billers, and so on. Advantageously, the consumer needs to set up the merchant only one time. Each bill payment can be customized with payment options such as recurring payment, scheduled date, etc. The consumer has access to payment history online. The consumer can usually download information to well-known software such as Quicken® software or Excel® software. However, many banks allow payment only via the consumer's DDA account for that bank. This does not allow for a credit option.

Yet another method includes paying by card or DDA on the Biller's website. Examples of common billers in this scheme include utilities, payment card companies, insurance, mortgage companies, phone service, cable and/or satellite service. Advantageously, the payment is immediate. However, this approach requires the consumer to go to multiple websites to pay, and to remember additional IDs and passwords. There is usually a 'processing fee.' It can be difficult to find information and there is usually no long-term payment history available.

A further method includes paying at the Biller's brick and mortar site by cash, check, or card. Examples of billers that might employ such a method include phone service, insurance, retail stores, card issuer, and some utilities. Advantageously, the consumer can use cash or check. The payment posts the same day. However, it is difficult to track payment history. The consumer must visit multiple physical locations.

Yet a further method includes paying via telephone or interactive voice response (IVR) system by card or DDA. Examples of billers employing such an approach include insurance, phone service, and the like. The payment is immediate. However, there is no payment history or verification unless and until an e-mail or statement is received. IVR systems may be difficult to route through.

Finally, sometimes payment through a credit counseling service or agency is employed. Biller examples include a government-subsidized agency or third party consumer service. Consumers can consolidate payments into one payment; in essence, a 'one-stop shop.' However, this approach is less flexible in scheduling and individual payment features. There can be a fee for this service.

In some instances, a payment network operator may wish to launch an initial pilot that would offer consumers the option to pay their bills using their credit or debit card through their bank's online banking site. In some instances, the addition of this feature is integrated into their online banking experience. Advantageously, key issuers (for example, significant commercial banks which issue payment cards) may be interested in this approach and may be willing to work with the payment network operator to build the interface to capture order intake. In at least some instances, a pilot program preferably leverages existing infrastructure to facilitate the capture and transmittal of card enrollment information from issuer to biller. Specifically, the payment network operator networks and/or systems pass through information, and existing third party relationships may be leveraged to facilitate the process.

A first non-limiting exemplary embodiment will now be described. As noted above, inventive techniques can be employed with any type of electronic bill payment system; by way of example and not limitation, an electronic bill payment and presentment (EBPP) service. In one or more embodiments, inventive techniques can be employed with the MASTERCARD RPPS® electronic payment system of MasterCard International Incorporated of Purchase, New York, USA. Throughout this document, reference is made to RPPS for illustrative purposes, it being understood that other types of electronic bill payment systems, including other types of electronic bill payment and presentment (EBPP) service, can be employed in other embodiments.

Figure 5:
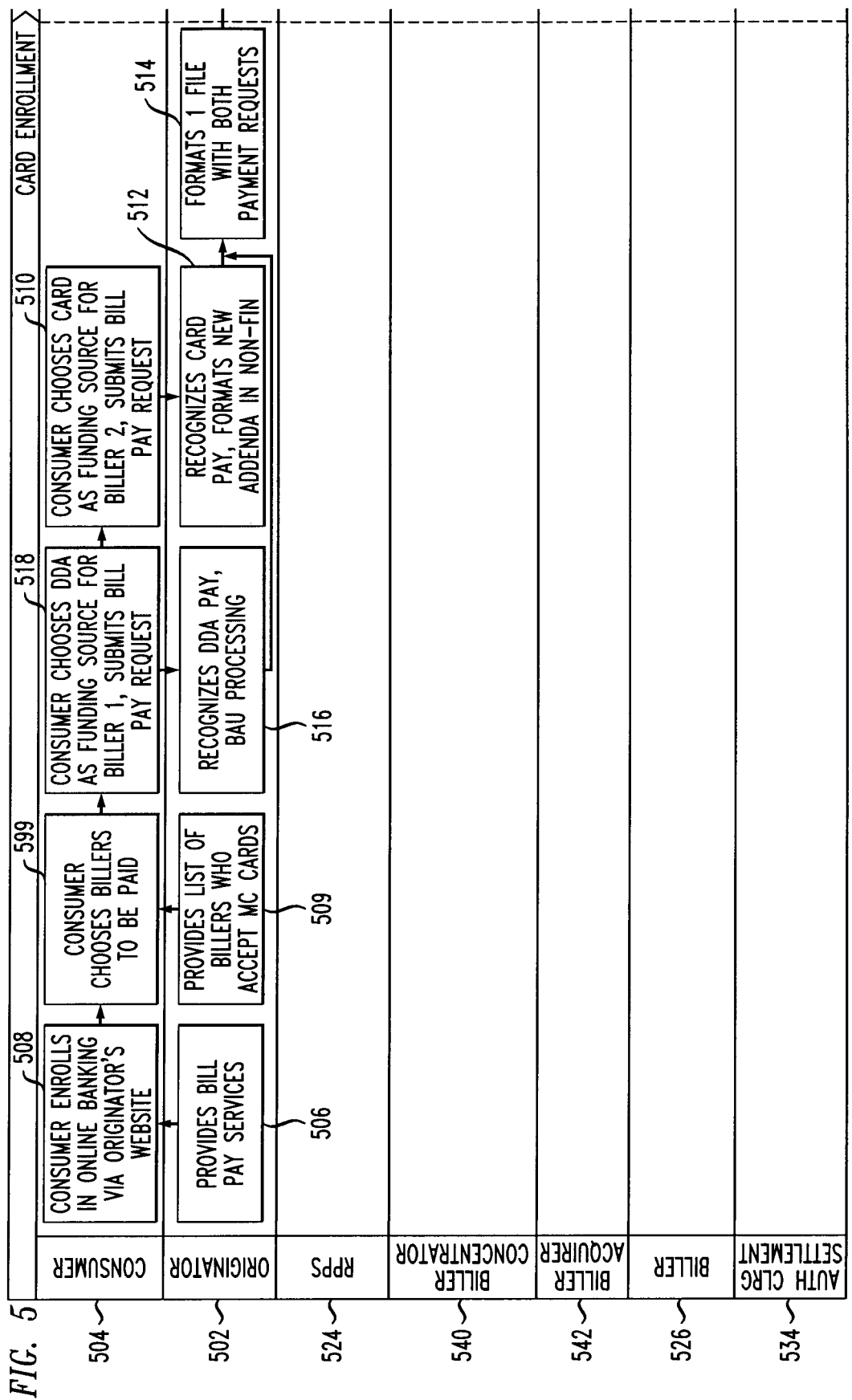
FIGS. 5 and 6 provide exemplary flows to illustrate additional aspects of the invention.
Figure 5:
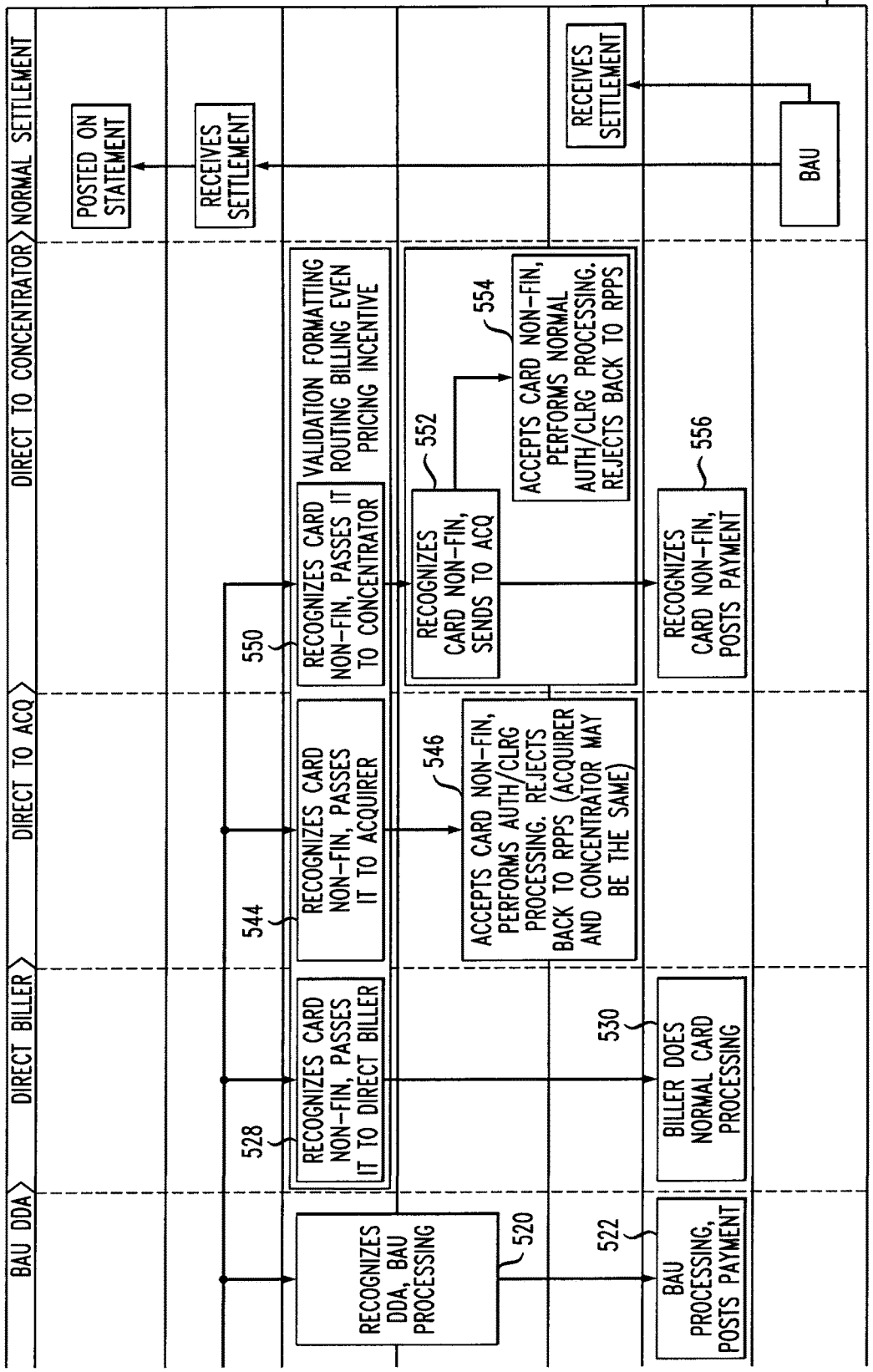

Aspects of the invention provide an initiative to support a pilot (or up-and-running solution) to allow an originator bank to send card bill payments in the same manner as it sends DDA bill payments. FIG. 5, discussed further below, depicts an illustrative process flow. In order to provide support for this service, the following actions can be implemented. The payment network operator (e.g., MasterCard International Incorporated, operator of the above-mentioned RPPS® system 524) preferably communicates to the originator 502 and/or issuer, on an on-going basis, a list of high volume billers that accept both card and EFT payments. The originator 502 and/or issuer enhances its bill pay website to include "card" as a payment method to consumers for those billers that accept card payments. The originator 502 and/or issuer enhances its system to submit and receive transactions related to these card payments.

Furthermore, a payment system such as the RPPS® system 524 is enhanced to support new data values and a new message addendum submitted by the originator 502 and/or issuer. These transactions are used for card payments. The RPPS® system 524 receives an enhancement to the biller directory (a database of billers with appropriate information, typically present in such systems, as will apparent to the skilled artisan) that identifies the billers 526 that also accept card payments. This identifier is used to validate submission of a card payment for this biller. The RPPS® system 524 directs these card transactions directly to the biller for processing. The biller 526 should be capable of receiving these new transactions and processing them as card payments.

In a preferred approach, identification of high volume bill pay billers that are customers of the electronic bill payment system of interest, and which also accept payment cards of the payment network operator (e.g., MasterCard cards) for payment, should be carried out to enable a product team to use the list when presenting the benefits of this new service to originators and/or issuers. Exemplary details are provided herein.

As noted above, the skilled artisan, given the teachings herein, will be able to implement one or more embodiments of the invention using a variety of techniques. In one or more instances, embodiments can be implemented by modifying an existing electronic bill payment system, such as the RPPS® system 524. A non-limiting exemplary list of enhancements that could be made to a current RPPS system to facilitate one or more aspects of the invention includes accepting non-financial transactions and a new addenda message; validating that the biller submitted on the card transaction accepts card payments; passing non-financial rejects to the originator 502; passing valid non-financials to direct biller 526; and receiving rejects or other non-financials from the biller and passing them to the originator 502.

A second non-limiting exemplary embodiment will now be described. In this approach, a payment network operator provides simple file transfer services between a bank and a biller. For a card enrollment pilot, the issuer bank allows a customer and/or cardholder to enter bill payment information at the issuer's website (or other channel). The issuer's website already has appropriate biller information available for selection. The bank generates one or more files with this enrollment request and passes it to the payment network operator using existing connectivity. The payment network operator then passes it to the biller and the biller performs business as usual (BAU) card payment processing (authorization and clearing).

Currently, to carry out a straight transfer of a file from one party to another, GFT (Global File Transfer) takes advantage of in-place connectivity and does not offer file transfer protocol (FTP) services. A straight transfer may be carried out because of a relationship with a member and a vendor or third party. As will be appreciated by the skilled artisan, GFT is a system available from MasterCard International Incorporated wherein files are transferred over a payment network of the kind shown in FIG. 9, and is a non-limiting example of data file transfer via a payment network. File transfer protocol (FTP) is the standard network protocol used to exchange and manipulate files over an Internet Protocol computer network, such as the Internet. FTP file transfer can be employed in other embodiments of the invention. Appropriate file retention and/or billing policies can be set within the GFT network or other network.

In one or more embodiments, a generic bulk type is set up for use in the GFT network or other network; such generic bulk type is passed through the network as a binary stream with no conversion and no file checking. A bulk type is also set up for each merchant. The issuer agrees on the file length and format. The payment network operator requests the bulk type and provides the file name to the issuer so that the GFT network or other network simply routes the file based on the file name.

By way of example and not limitation, three examples are presented for straight through file submissions; namely, one-to-one, many-to-many with multiple issuer files, and many-to-many with one issuer file. Security concerns are typically the same for all three.

Figure 2:
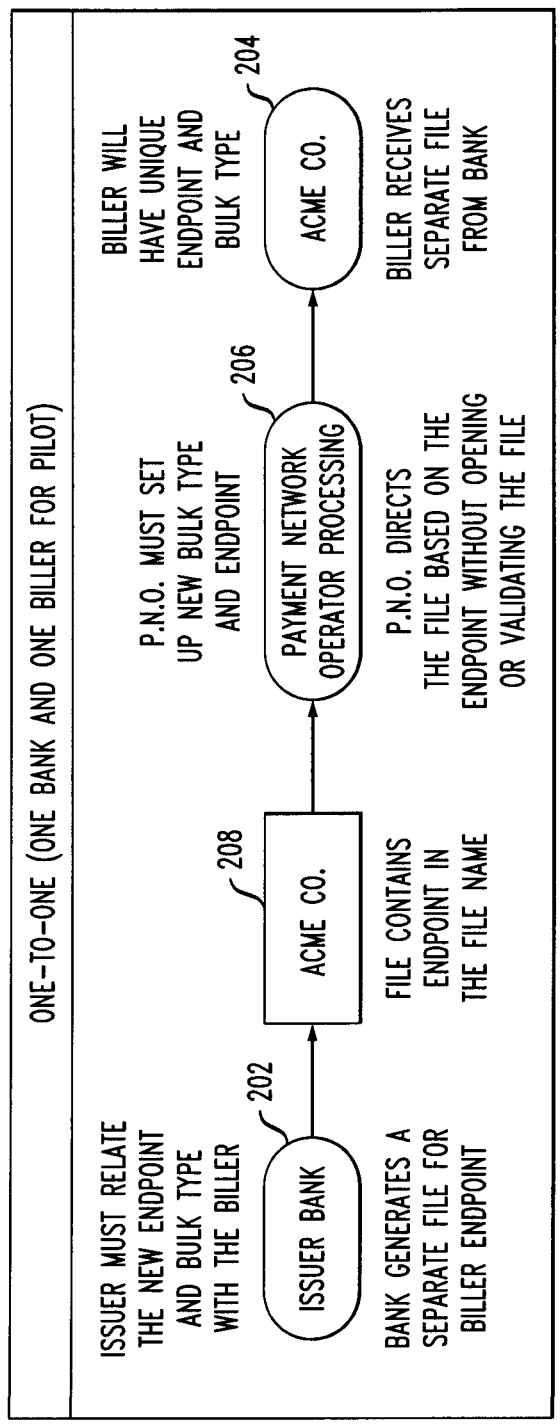
FIG. 2 shows an example one-to-one file submission, according to an aspect of the invention.

One-to-one approach: In this approach, as seen in FIG. 2, one issuer 202 and one biller 204 participate in an exemplary pilot (or up-and-running program). The issuer 202 allows the consumer to see the biller 204 that accepts cards for payment. The biller 204 typically needs a new endpoint which both the payment network operator (P.N.O.) 206 (MasterCard International Incorporated is a non-limiting example) and the issuer 202 must recognize. The issuer 202 and biller 204 agree on a file format. The payment network operator 206 does not open or validate the file or any data. A new bulk type is needed and recognized by all three parties. The issuer 202 generates a file containing all enrollment messages for the biller 204. The file name, as seen at 208, includes the endpoint ("ACME Co.) and "bulktype" (i.e., a data filed designating that the file is a bulk file and what type of bulk file it is). Note, "ACME Co." is a non-limiting example of a biller. The payment network operator 206 directs the file to the biller 204 based on the bulktype and endpoint in the file name. The biller 204 receives one file from the participating bank.

Figure 3:
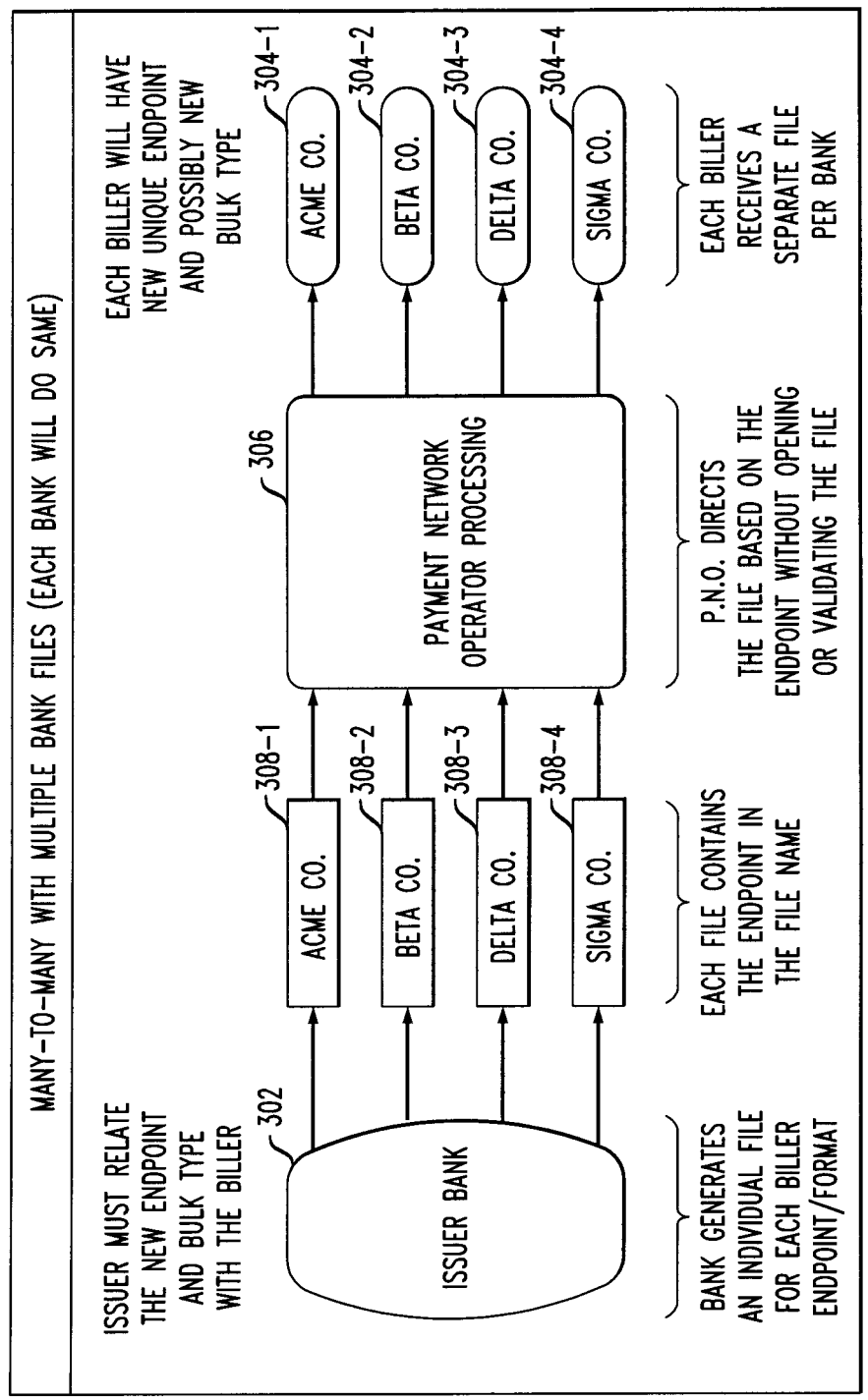
FIG. 3 shows an example many-to-many file submission with multiple bank files, according to another aspect of the invention.

Many-to-many approach with multiple issuer files: As seen in FIG. 3, this approach allows for multiple issuers 302 and multiple billers 304-1 through 304-4 for the pilot (or up-and-running solution). Each biller 304-1 through 304-4 typically requires a new, unique endpoint. Each biller 304-1 through 304-4 may have a unique format. A new bulk type is typically needed for each format. The issuers 302 must accommodate the format. The payment network operator 306 does not open or validate the file or any data. The issuer 302 generates a separate file 308-1 through 308-4 for each biller 304-1 through 304-4. Each file name contains the endpoint for that specific biller 304-1 through 304-4 as well as the bulk type. The payment network operator 306 directs each file to the biller 304-1 through 304-4 based on the endpoint. The biller 304-1 through 304-4 receives a separate file from each participating bank.

Figure 4:
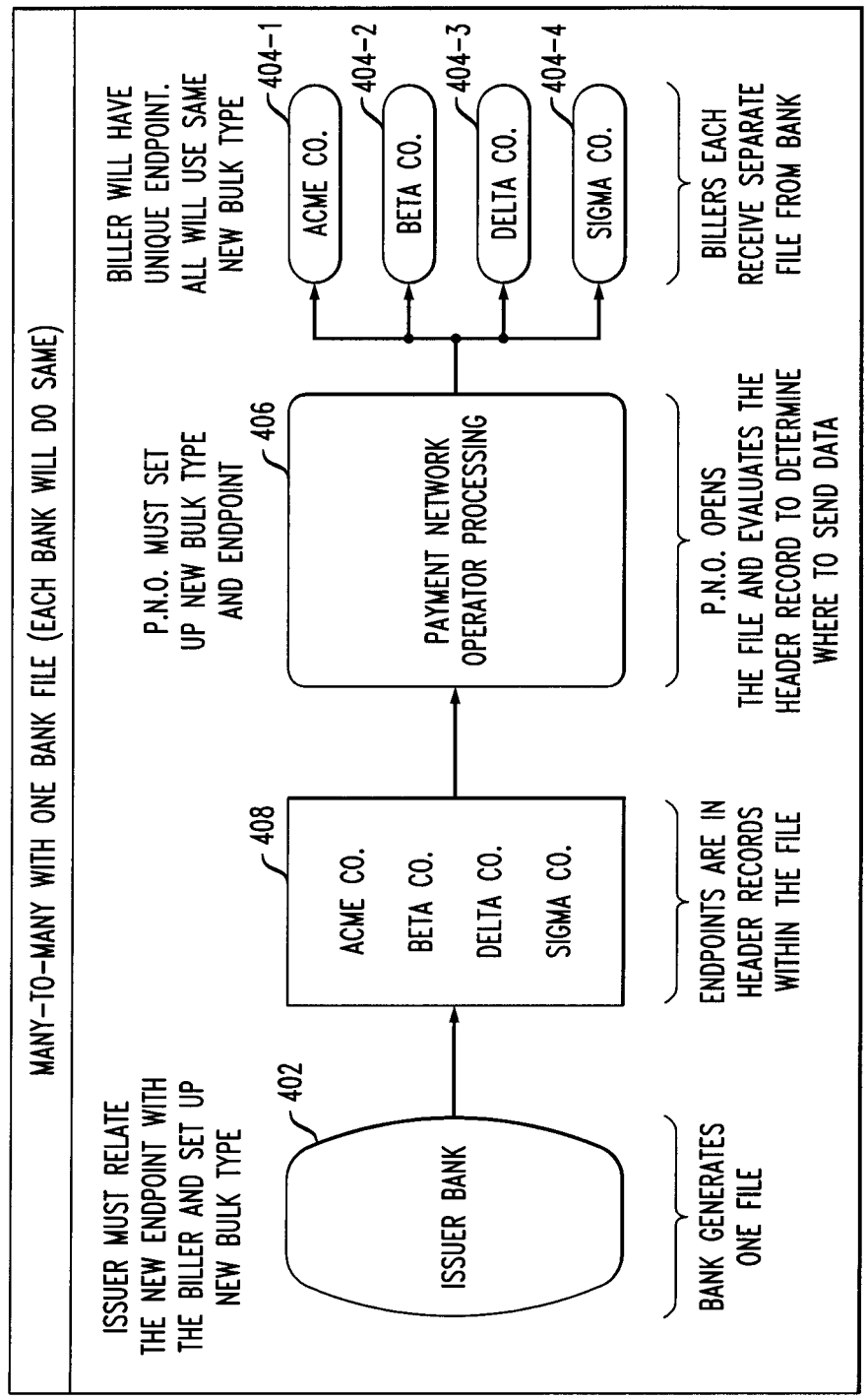
FIG. 4 shows an example many-to-many file submission with one bank file, according to yet another aspect of the invention.

Many-to-many approach with one issuer file: As seen in FIG. 4, this approach allows for multiple issuers 402 and multiple billers 404-1 through 404-4 for the pilot (or up-and-running solution). Each biller 404-1 through 404-4 typically requires a new, unique endpoint. The payment network operator 406 defines the format to be used (with direction from the billers 404-1 through 404-4 and banks 402). A new bulk type must typically be defined for the new file. The issuer 402 may generate one file 408 containing all enrollment messages for all participating billers 404-1 through 404-4. Header records contain the endpoint information. The payment network operator 406 opens the file 408 and segregates the enrollment messages based on endpoint, then builds files for each biller 404-1 through 404-4. The payment network operator 406 directs each file to the biller 404-1 through 404-4 based on the endpoint. The biller 404-1 through 404-4 receives one file from the payment network operator 406 containing all records for that processing period from all participating banks.

There are a number of methods of passing a file through a payment system; for example:

a virtual private network (VPN) such as shown in FIG. 9 (e.g., the Banknet® network)

Internet—using a suitable secure technique for communicating data over the Internet, for example, an existing method such as MasterCard International Incorporated's MFE (MASTERCARD FILE EXPRESS) or the well-known secure file transfer protocol (SFTP) technique or similar techniques. As will be appreciated by the skilled artisan, the same are generally representative of so-called Straight-Through-Processing (STP) techniques which enable electronic payments to flow seamlessly from, for example, a company's Accounts Payable system, through the banking infrastructure, and to a vendor's Accounts Receivable system. Note that in at least some instances, STP techniques can also be employed in connection with the above-discussed VPN file transfer. The Straight Through Processing Transaction Set 820 (hereafter "STP 820") was developed by the Electronic Payments Network and represents a widely adopted standardized format that may be employed in one or more embodiments. The skilled artisan will appreciate that "820" in this context is a transaction set, not a reference to the processor 820 in FIG. 8. The skilled artisan will also appreciate that MasterCard File Express is an example of an application accessible online which handles both the compression and encryption of data for transmission, using, for example, the International Data Encryption Algorithm (IDEA) encryption scheme.

The above both provide encryption and represent currently preferred approaches.

As the data in the file 408 rises in confidentiality, the encryption level preferably rises incrementally. Since the payment network operator will typically not be fully validating the data, the highest level of encryption available is preferably employed in order to protect the payment network operator and its customers.

In at least some embodiments, no card validation is required to be done prior to submission of the payment by the originator and/or issuer; supporting transactions such as presentments and acknowledgements are not required; and the online banking website may already provide services such as customer service, fraud prevention tools, and privacy tools. Furthermore, in one or more instances, dual message card transactions are preferred to be processed.

Reference should again be had to FIG. 5, which depicts exemplary card enrollment transaction processing for the first exemplary embodiment. The originator 502 supports card enrollment of consumer 504 via the originator's current online bill pay website, as per blocks 506, 508. Block 509 indicates the originator providing the consumer a list of billers who accept MasterCard cards (or other appropriate cards). In block 599, the consumer chooses one or more billers to be paid. When a card payment is requested in block 510, the originator 502 will modify the existing RPPS (or other electronic bill payment system) transaction to allow for card information, as per block 512. In a preferred approach, this will be considered a 'non-financial' transaction wherein the standard entry will be changed to indicate that it is a card payment; e.g., change the standard entry from XXXXX to 'CARD PAYMNT.' The detail entry will typically have a new transaction code, the new amount will be zero, and the gross amount will be the amount of payment in the first 10 positions of the "consumer name" field. The last 5 positions in the consumer name field will be asterisks for PCI compliance (the skilled artisan is aware of the PCI Security Standards Council Delaware, USA). The originator 502 will create an addenda message to accompany the non-financial (i.e., card) transaction. The addenda will have a new type code. The addenda will contain the card number and expiration date. The addenda will also contain the card verification code (CVC) information. The card payment transactions can be sent with the originator's normal payment file, as shown at block 514 (conventional DDA transaction flow is shown at blocks 518, 516, 520, 522). The originator 502 should be capable of receiving rejected card transaction back from the electronic bill payment system 524 and notifying the consumer 504 of the reject. The originator 502 should be capable of receiving payment notifications for these card payments.

The electronic bill payment system 524 recognizes the non-financial transaction and verifies that the biller 526 accepts MasterCard card payments (or card payments associated with another appropriate type of card being used). Once submitted by the Originator, the card payment could be processed in one of several ways, as per the points below, which represent non-limiting examples.

Direct Biller: In this approach, the electronic bill payment system 524 sends the information directly to the biller 526, as per block 528. In block 530, the biller 526, being designated a 'Direct Biller,' receives the transaction and processes it as any other card transaction (for example, as a card transaction that was submitted on the biller's website). Standard authorization, clearing, and settlement occur as per column 532 and row 534. The biller 526 should send a non-financial acknowledgement message to the originator 502. If the authorization is declined, the biller 526 should send a reject transaction back to the originator 502 through the electronic bill payment system 524. Reconciliation of the card payment occurs via standard processes.

Direct to Acquirer: In this approach, either: (i) the concentrator 540 and acquirer 542 are the same, or (ii) the concentrator 540 is not involved in the process. As per block 544, the electronic bill payment system 524 sends the information directly to the acquirer 542 (note the acquirer 542 may also be the concentrator 540 for the biller 526). The acquirer 542 recognizes the new format in block 546 and uses the non-financial transaction to format standard authorization and clearing. Standard authorization, clearing, and settlement occur as per 532, 534. The acquirer 542 may need to modify reconciliation procedures with the biller 526. If the authorization is declined, the acquirer 542 should send notification back through RPPS 524.

Direct to Concentrator: This approach assumes the concentrator 540 and the acquirer 542 are different. The electronic bill payment system 524 sends the information directly to the concentrator 540 as per block 550. The concentrator 540 recognizes the non-financial card transactions in block 552 and submits them to the biller's acquirer 542 as per block 554. The concentrator 540 sends payment notification to the biller 526 who posts the payment to the consumer's account as per block 556. The acquirer 542 recognizes the new format and uses the non-financial transaction to format standard authorization and clearing. Standard authorization, clearing, and settlement occur, as per 532, 534. The acquirer 542 may need to modify reconciliation procedures with the biller 526. If the authorization is declined, the acquirer 542 should send notification back through electronic bill payment system 524.

In one or more embodiments, the following impacts will be experienced for the solution depicted in FIG. 5. These are summarized below by party.

Consumer: The consumer will enroll in online bill payment via the originator's website, choose the funding source as either DDA or card, select the biller(s) to be paid, and submit a request for bill payment.

Originator Bank: The originator bank will provide for card payments on its banking bill pay website. The consumer experience should preferably include the following:
Interface for order intake
Email confirmation that the consumer is enrolled
Alert feature when bills are due and/or paid
Notification when a bill is paid
Notification if a bill payment is declined
Overdraft protection for credit worthy debit consumers
Ability to monitor payments
Provide online payment features to the consumer such as paper suppression and recurring payments
Provide a list of billers to the consumer that accept MasterCard cards (or other appropriate cards as the case may be) for payment In addition, with respect to a card funding source, if the card belongs to the originator, the originator will preferably ensure card validation. The originator will also preferably provide customer service for the originator's cardholders. This may include additional bank representative training. Further, the originator may provide transaction submission and/or receipt requirements, such as the following:
For card payments, format non-financial transaction and associated addenda
Include non-financial transaction for card payments in normal RPPS file with DDA payments
Accept non-financial rejects related to card payments from RPPS and communicate to consumer Biller/Merchant: This party will accept the transaction with addenda. Custom formats from the electronic bill payment system 524 are preferably possible if requested.

For solutions other than Direct Biller, additional impacts may be experienced, in one or more embodiments, as per the following.

Biller/Merchant: In some instances, this party will accept financial transactions from the concentrator if not direct billing, and will use the financial and new amount data field to update records and post payment.

Concentrator: In some instances, this party will accept non-financial transactions with addenda. Custom formats from the electronic bill payment system 524 are preferably possible if requested. The concentrator will recognize these non-financials as card payments, and will pass the non-financial transaction to the acquirer (if different than concentrator) if necessary.

Acquirer: The acquirer will accept the transaction with addenda (if different than concentrator). Custom formats from the electronic bill payment system 524 are preferably possible if requested. The acquirer uses the transaction to initiate an authorization request, accommodates the transaction when performing reconciliation with the biller and/or merchant (these card transactions were not initiated at the biller's site, so they would not be included in that part of the reconciliation); and handles authorization declines when the auth request was not initiated from the biller. If the transaction was received via electronic bill payment system 524, the acquirer routes rejects back through electronic bill payment system 524.

Note that in FIG. 5, blocks 509, 510, 512, 514, 528, 530, 544, 546, 550, 552, 554, 556 represent impact to the participants while the remaining blocks represent "business as usual."

It should be emphasized that FIG. 5 and its description represent one specific but non-limiting embodiment. Other embodiments could use different messages and/or a different form of electronic bill paying system, or could differ in many other ways.

Figure 6:
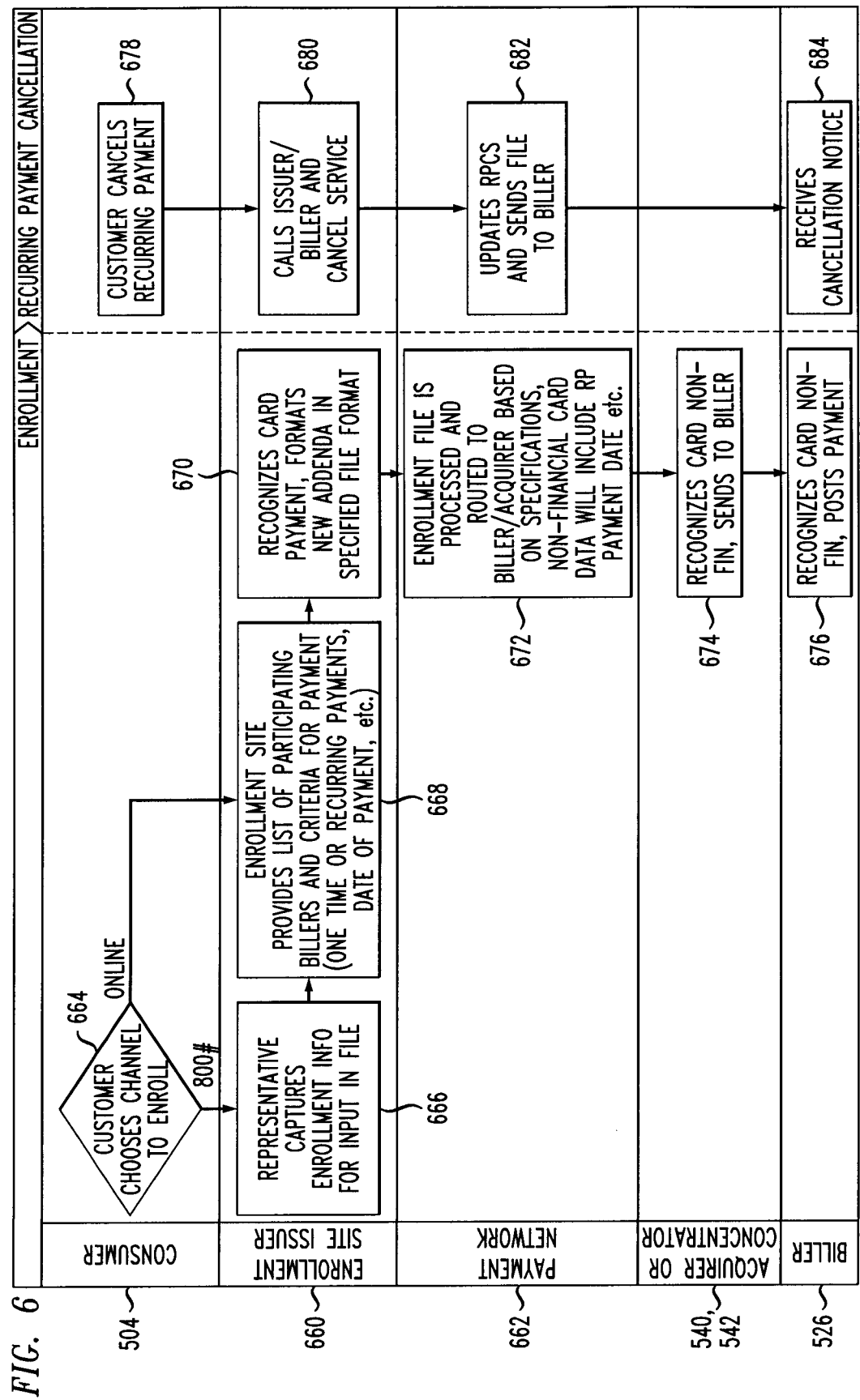

As seen in FIG. 6, in an exemplary card enrollment, consumer 504 chooses a channel to enroll at block 664. If via toll free number, at block 666, enrollment site issuer 660 has a representative who captures required information in block 666, and enters same on a web site as per block 668. If consumer 504 enrolls online, flow proceeds directly to block 668. In block 670, issuer 660 recognizes the card payment and formats new addenda. The payment network operator processes the file as per block 672; recognition by acquirer or concentrator 540, 542 is depicted at block 674, and posting of payment is shown at block 676 by biller 526. Note that "RP" stands for recurring payment.

When consumer 504 wants to cancel a recurring payment, as per block 678, the issuer and/or biller are called as per block 680; appropriate update is carried out by payment network operator 662 in block 682 with the cancellation notice received by the biller 526 in block 684. Note that "RPCS" stands for recurring payment cancellation service.

Figure 7:
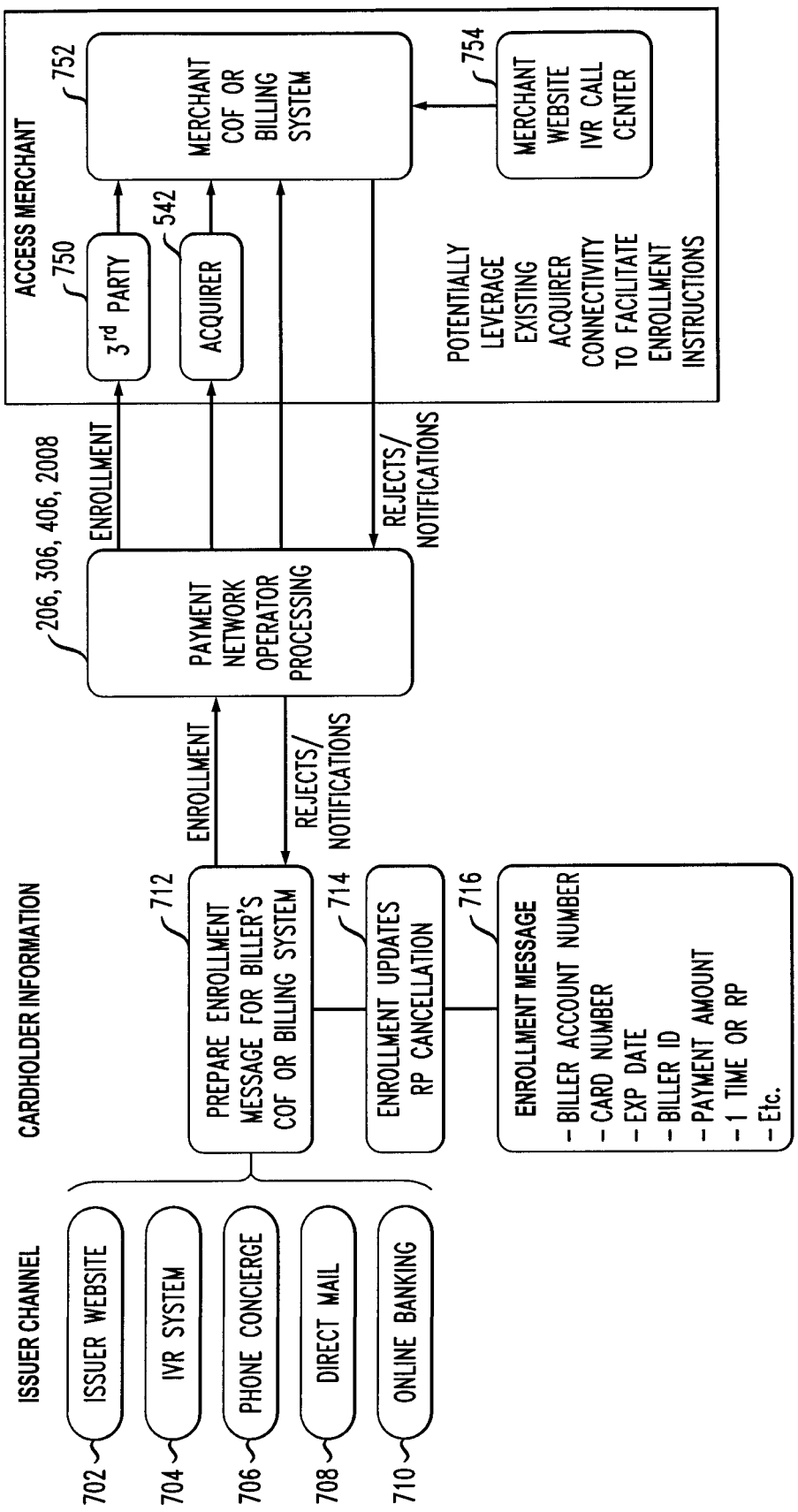
FIG. 7 presents an illustrative diagram for a merchant card on file system, according to still another aspect of the invention.

As seen in FIG. 7, contact with the issuer can be had via a number of different channels 702 through 710. In block 712, an enrollment message is prepared for the biller's COF (card-on-file or account-on-file) or billing system 752. Block 714 indicates enrollment, updates, and RP cancellation. An exemplary enrollment message is shown at 716. Processing by a payment network operator such as 206, 306, 406, 2008 is shown. Access to block 752 of the merchant may be had, for example, by acquirer 542 or third party 750. Enrollment may be facilitated by an existing web site, IVR (interactive voice response) system or call center, as shown at 754.

Given the description thus far, it will be appreciated that, in general terms, an exemplary method, according to an aspect of the invention, includes the step of offering, by a bill payment provider (e.g., originating bank 502) to a customer 504, an option to pay a bill from a biller 526 using a payment card account. A customer may include, for example, a consumer, small business, etc. The offering is carried out via a mechanism (e.g., an on-line bill paying web site or a call center, possibly with interactive voice response (IVR)) of the bill payment provider. Refer to blocks 506, 508, and 599 of FIG. 5. The mechanism is of the kind which normally facilitates payments via electronic funds transfer from a demand deposit account of the customer, as per blocks 516, 518, 520, 522 of FIG. 5. The account may, but need not, be with the provider. An additional step includes receiving, via the mechanism, a request to pay the bill using the payment card account, as per block 510 of FIG. 5.

A further step includes facilitating payment of the bill using the payment card account by formatting and dispatching a message from the bill payment provider to an electronic bill payment system 524, as shown at blocks 512, 514 of FIG. 5. The message is flagged with a flag indicating that the message is a non-financial, card payment, message. The message includes an identification of the biller, the card number of the payment card account, and the expiration date of the payment card account. The message is an electronic funds transfer message augmented with the flag, the card number, and the expiration date. As used herein, including the claims, the message is said to be augmented when the indicated information is added directly to it, or is otherwise associated with it, such as in the addendum described in the specific embodiment above.

An additional step can include facilitating the customer 504 enrolling for the option to pay the bill using the payment card account, by providing to the customer a list of billers which accept payment card payment, as at step 509. The biller 526 is on the list. The bill payment provider may receive the list from the operator of a payment network 206, 306, 406, 2008. In at least some instances, the operator of the payment network also operates the electronic bill payment system 524.

The bill payment provider may or may not be the issuer for the payment card account.

In some instances, the electronic bill payment system forwards the message to the biller, as at 528, and the biller carries out normal processing of the bill using the card number and the expiration date. If the normal processing fails, the electronic bill payment system may route a rejection message from the biller to the bill payment provider.

In another approach, the electronic bill payment system forwards the message to an acquirer, as at 544, and the acquirer carries out normal processing of the bill using the card number and the expiration date, as at 546. If the normal processing fails, the electronic bill payment system may route a rejection message from the acquirer to the bill payment provider.

In yet another approach, the electronic bill payment system forwards the message to a concentrator, as at 550, the concentrator forwards the message to an acquirer associated with the biller, as at 552, and the acquirer associated with the biller carries out normal processing of the bill using the card number and the expiration date, as at 554. If the normal processing fails, the electronic bill payment system may route a rejection message from the acquirer to the bill payment provider.

As discussed elsewhere, in some instances, the electronic bill payment system 524 validates the identification of the biller in the message against the list of billers provided in block 509.

In another aspect, an exemplary method includes the step of offering, by a bill payment provider to a customer, an option to pay a bill from a biller using a payment card account. The bill payment provider is of a kind that normally allows payment by electronic funds transfer (EFT) from a demand deposit account. A non-limiting example of a bill payment provider is an issuer bank (which may or may not be the issuer of the payment card actually used to make the payment). In general, the bill payment provider may or may not be a financial institution. The offering is carried out via a mechanism which normally facilitates payments via electronic funds transfer from a demand deposit account of the customer (which may, but need not, be at the provider). Exemplary mechanisms include blocks 702-710, with logic for use of a web site or web site and call center shown at 664, 666, 668. The provider receives, via the mechanism, a request to pay the bill using the payment card account. The provider facilitates payment of the bill using the payment card account by formatting and dispatching a file from the provider to the biller, via an operator of a payment network. Refer to step 670, recognizing that this step can in general be an initial enrollment or directions for a subsequent payment, and see also files 208, 308, 408. The file includes an identification of the biller, the card number of the payment card account, and the expiration date of the payment card account. As noted, the mechanism could be, for example, an on-line bill paying web site 702 of the provider, a call center (e.g., IVR, manned, etc.—see blocks 704, 706) of the provider, and the like. The operator of the payment network 206, 306, 406, 662, 2008 forwards the file to the biller, and the biller carries out normal processing of the bill using the card number and the expiration date.

In a "one-to-one" approach, the file 208 is in a format agreed upon by the provider and the biller and is flagged as a bulk file using a bulk file flag recognized by the provider, the biller, and the operator of the payment network.

In a "many-to-many" approach, the bill is a first bill, the biller is a first biller, and the file is a first file, and at least the steps of receiving the request and facilitating the payment are repeated for at least a second bill of at least a second biller, using at least a second file. The files 308-1, 2, 3, and 4 may have different formats.

In a "many-to-one" approach, the bill is a first bill, and the biller is a first biller, and at least the steps of receiving the request and facilitating the payment are repeated for at least a second bill of at least a second biller, using the file 408.

Figure 8:
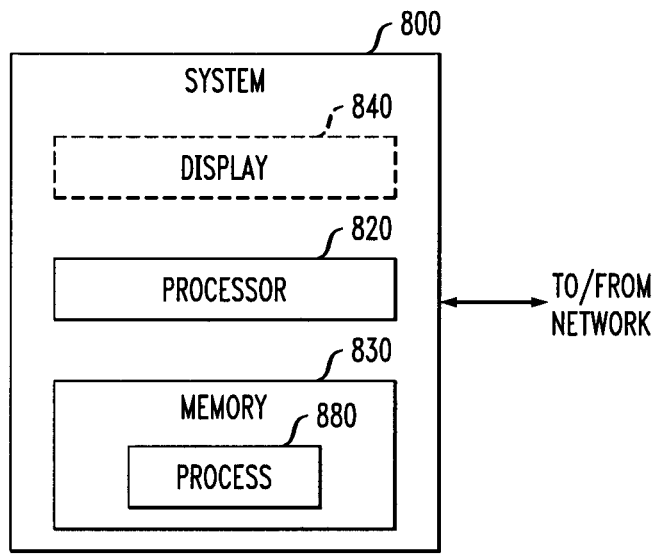
FIG. 8 is a block diagram of an exemplary computer system useful in one or more embodiments of the invention.

In still another aspect, an exemplary system includes a bill payment provider server, under control of a bill payment provider. An example of a server is depicted in FIG. 8 and discussed below. The server includes an interface to an electronic bill payment system 524. A (hardware) processor of the bill payment provider is operative to implement the above-discussed bill payment mechanism (e.g., call center, possibly with IVR; on-line bill paying web site), offer the card payment option, receive the request to pay the bill using the payment card account, and facilitate payment of the bill as discussed above. In general, the processor of the bill payment provider server may implement functionality shown for originator 502 in FIG. 5, for example, by running a suitable software platform on the server. For example, the processor of the bill payment provider server can facilitate the customer enrolling for the option to pay the bill using the payment card account, by providing to the customer the list of billers which accept payment card payment, and the processor may receive the list via an interface to bill payment system 524.

In still another aspect, an exemplary system includes a bill payment provider server, under control of a bill payment provider. Again, an example of a server is depicted in FIG. 8 and discussed below. The bill payment provider server includes an interface to a payment network 206, 306, 406, 662, 2008. A (hardware) processor of the bill payment provider server is operative to facilitate the above-discussed file transfer methodology.

An overall system may include additional servers, clients, or other computers of other entities, interconnected by one or more networks as discussed herein.

System and Article of Manufacture Details

The invention can employ hardware and/or hardware and software aspects. Software includes but is not limited to firmware, resident software, microcode, etc. Software might be employed, for example, in connection with one or more of a terminal 122, 124, 125, 126; a processing center 140, 142, 144 (optionally with data warehouse 154) of a merchant, issuer, acquirer, processor, concentrator, payment network operator, originator, or any other entity as depicted in FIGS. 2-7 and 9-11; and the like. Firmware might be employed, for example, in connection with payment devices such as cards 102, 112.

FIG. 8 is a block diagram of a system 800 that can implement part or all of one or more aspects or processes of the invention. As shown in FIG. 8, memory 830 configures the processor 820 (which could correspond, e.g., to processor portions 106, 116, 130, processors of remote hosts in centers 140, 142, 144, or processors associated with any entities as depicted in FIGS. 2-7 and 9-11, and the like) to implement one or more aspects of the methods, steps, and functions disclosed herein (collectively, shown as process 880 in FIG. 8). Different method steps can be performed by different processors. The memory 830 could be distributed or local and the processor 820 could be distributed or singular. The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center.

As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, processors associated with any entities as depicted in FIGS. 2-7 and 9-11, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, the aforementioned terminals 122, 124, 125, 126; processing centers 140, 142, 144 with data warehouse 154; processors associated with any entities as depicted in FIGS. 2-7 and 9-11; and the like, or payment devices such as cards 102, 112; can make use of computer technology with appropriate instructions to implement method steps described herein. By way of further example, a terminal apparatus 122, 124, 125, 126 could include, inter alia, a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card or read a magnetic stripe).

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable storage medium. Further, one or more embodiments of the invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include modules for the originator, bill payment system, concentrator, acquirer, biller, issuer, payment network, and so on (for example, in the form of platforms). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers or personal computers, located at one or more of the entities in FIGS. 2-7 and 9-11, as well as within the payment network. Such computers can be interconnected, for example, by one or more of payment network 210, another VPN, the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic and/or data flow depicted in, for example, FIGS. 2-7.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention. For example, items described in terms of a pilot program may be extended to encompass more entities, and items listed as mandatory in some exemplary embodiments may be optional in others, and vice versa.

What is claimed is:

1. A method comprising the steps of:
preparing, using a processor of a bill payment provider, an electronic funds transfer format message for dispatch from said bill payment provider to an electronic bill payment system that normally facilitates payments via electronic funds transfer from demand deposit accounts;
flagging, using said processor of said bill payment provider, said electronic funds transfer format message with a flag indicating that said electronic funds transfer format message is a non-financial, card payment, message, said electronic funds transfer format message comprising an identification of a biller;
creating, using said processor of said bill payment provider, an addenda message including a card number of said payment card account and an expiration date of said payment card account; and
dispatching, by said processor of said bill payment provider, said electronic funds transfer format message, flagged with said flag and augmented with said addenda message including said card number of said payment card account and said expiration date of said payment card account, to said electronic bill payment system via a payment network, said electronic funds transfer format message flagged with said flag causing said electronic bill payment system to forward, via said payment network, said addenda message including said card number of said payment card account and said expiration date of said payment card account to at least one of said biller, an acquirer of said biller, and a concentrator of said biller, wherein said electronic bill payment system is disposed in said payment network connecting said bill payment provider to said least one of said biller, said acquirer of said biller, and said concentrator of said biller.

2. The method of claim 1, further comprising facilitating a customer enrolling in an option to pay a bill using said payment card account, by providing to said customer a list of billers which accept payment card payment, said biller being on said list.

3. The method of claim 2, further comprising said bill payment provider receiving said list from an operator of said payment network.

4. The method of claim 3, wherein said operator of said payment network also operates said electronic bill payment system.

5. The method of claim 1, wherein said bill payment provider is an issuer of said payment card account.

6. The method of claim 1, further comprising:
said electronic bill payment system forwarding said electronic funds transfer format message, flagged with said flag, and said addenda message including said card number of said payment card account and said expiration date of said payment card account, to said biller; and
said biller carrying out normal processing of a bill using said card number and said expiration date by dispatching an ISO 8583 payment card authorization request to said acquirer of said biller.

7. The method of claim 6, further comprising said electronic bill payment system routing a rejection message from said biller to said bill payment provider upon determining that said normal processing fails.

8. The method of claim 1, further comprising:
said electronic bill payment system forwarding said electronic funds transfer format message, flagged with said flag, and said addenda message including said card number of said payment card account and said expiration date of said payment card account, to said acquirer of said biller; and
said acquirer of said biller carrying out normal processing of a bill using said card number and said expiration date by dispatching an ISO 8583 payment card authorization request into said payment network connecting multiple issuers and multiple acquirers.

9. The method of claim 8, further comprising said electronic bill payment system routing a rejection message from said acquirer of said biller to said bill payment provider upon determining that said normal processing fails.

10. The method of claim 1, further comprising:
said electronic bill payment system forwarding said electronic funds transfer format message, flagged with said flag, and augmented with said addenda message including said card number of said payment card account and said expiration date of said payment card account, to said concentrator of said biller;
said concentrator forwarding said electronic funds transfer format message, flagged with said flag, and augmented with said addenda message including said card number of said payment card account and said expiration date of said payment card account, to said acquirer of said biller; and
said acquirer of said biller carrying out normal processing of a bill using said card number and said expiration date by dispatching an ISO 8583 payment card authorization request into said payment network connecting multiple issuers and multiple acquirers.

11. The method of claim 10, further comprising said electronic bill payment system routing a rejection message from said acquirer of said biller to said bill payment provider upon determining that said normal processing fails.

12. The method of claim 4, further comprising said electronic bill payment system validating said identification of said biller in said electronic funds transfer message, flagged with said flag, against said list.

13. A system comprising:
a bill payment provider server, under control of a bill payment provider, said bill payment provider server in turn comprising:
a bill payment provider memory;
at least one bill payment provider processor coupled to said bill payment provider memory; and
an interface to an electronic bill payment system, said interface being coupled to said bill payment provider processor;
wherein said bill payment provider processor is operative to:
implement a bill payment mechanism of a kind which normally facilitates payments via electronic funds transfer from a demand deposit account of a customer;
offer to said customer, via said mechanism, an option to pay a first bill from a first biller using a payment card account;
offer to said customer, via said mechanism, an option to pay a second bill from a second biller using said demand deposit account of said customer;
receive, via said mechanism, a request to pay said first bill using said payment card account;
receive, via said mechanism, a request to pay said second bill using said demand deposit account of said customer;
facilitate payment of said second bill using said demand deposit account of said customer by preparing and dispatching a business as usual electronic funds transfer format message from said bill payment provider to the electronic bill payment system via said interface, said business as usual electronic funds transfer format message being configured to cause the electronic bill payment system to pay said second bill using said demand deposit account of said customer; and
facilitate payment of said first bill using said payment card account by:
preparing an electronic funds transfer format message for dispatch via said electronic bill payment system interface;
flagging said electronic funds transfer format message with a flag indicating that said electronic funds transfer format message is a non-financial, card payment, message, said electronic funds transfer format message comprising an identification of said biller;
creating an addenda message including a card number of said payment card account and an expiration date of said payment card account; and
dispatching said electronic funds transfer format message, flagged with said flag and augmented with said addenda message including said card number of said payment card account and said expiration date of said payment card account, to the electronic bill payment system via said interface, said electronic funds transfer format message flagged with said flag causing the electronic bill payment system to forward said addenda message including said card number of said payment card account and said expiration date of said payment card account to at least one of said first biller, an acquirer of said first biller, and a concentrator of said first biller and to refrain from paying said first bill using said demand deposit account of said customer.

14. The system of claim 13, wherein said mechanism comprises at least one of:
an on-line bill paying web site of said bill payment provider; and
a call center of said bill payment provider.

15. A system comprising:
- means for offering, by an bill payment provider to a customer, an option to pay a first bill from a first biller using a payment card account, said offering being carried out via a mechanism of said bill payment provider, said mechanism being of a kind which normally facilitates payments via electronic funds transfer from a demand deposit account of said customer;
- means for offering, by said bill payment provider to said customer, an option to pay a second bill from a second biller using said demand deposit account of said customer, said offering being carried out via said mechanism of said bill payment provider;
- means for receiving, via said mechanism, a request to pay said first bill using said payment card account;
- means for receiving, via said mechanism, a request to pay said second bill using said demand deposit account of said customer;
- means for facilitating payment of said second bill using said demand deposit account of said customer by preparing and dispatching a business as usual electronic funds transfer format message from said bill payment provider to an electronic bill payment system, said business as usual electronic funds transfer format message being configured to cause said electronic bill payment system to pay said second bill using said demand deposit account of said customer; and
- means for facilitating payment of said bill using said payment card account by:
  - preparing an electronic funds transfer format message for dispatch from said bill payment provider to said electronic bill payment system;
  - flagging said electronic funds transfer format message with a flag indicating that said electronic funds transfer format message is a non-financial, card payment, message, said electronic funds transfer format message comprising an identification of said biller;
  - creating an addenda message including a card number of said payment card account and an expiration date of said payment card account; and
  - dispatching said electronic funds transfer format message, flagged with said flag and augmented with said addenda message including said card number of said payment card account and said expiration date of said payment card account, to said electronic bill payment system, said electronic funds transfer format message flagged with said flag causing said electronic bill payment system to forward said addenda message including said card number of said payment card account and said expiration date of said payment card account to at least one of said first biller, an acquirer of said first biller, and a concentrator of said first biller and to refrain from paying said first bill using said demand deposit account of said customer.

* * * * *